United States Patent [19]

Johnstone

[11] E Re. 31,247

[45] Reissued May 17, 1983

[54] DIAGNOSTIC COMMUNICATIONS SYSTEM FOR COMPUTER CONTROLLED MACHINE TOOLS

[75] Inventor: Richard Johnstone, Brookfield, Wis.

[73] Assignee: Kearney & Trecker Corporation, Milwaukee, Wis.

[21] Appl. No.: 299,866

[22] Filed: Sep. 8, 1981

Related U.S. Patent Documents

Reissue of:

[64] Patent No.: 3,882,305
Issued: May 6, 1975
Appl. No.: 433,439
Filed: Jan. 15, 1974

[51] Int. Cl.[3] ..... G06F 15/46

[52] U.S. Cl. ..... 364/474; 364/138; 364/167; 364/186; 371/20

[58] Field of Search ..... 364/474, 475, 138, 139, 364/167-171, 814-187, 200 MS File, 900 MS File; 318/563, 565, 567, 569; 371/20, 67, 68

[56] References Cited

U.S. PATENT DOCUMENTS

| | | | |
|---|---|---|---|
| 3,623,013 | 11/1971 | Perkins et al. | 364/200 |
| 3,731,070 | 5/1973 | Urban | 364/551 |
| 3,777,128 | 12/1973 | Kirkham | 364/139 |

FOREIGN PATENT DOCUMENTS

| | | | |
|---|---|---|---|
| 1909453 | 9/1969 | Fed. Rep. of Germany | 364/474 |
| 1934220 | 1/1970 | Fed. Rep. of Germany | 364/474 |
| 1524701 | 9/1970 | Fed. Rep. of Germany | 364/474 |
| 1524175 | 10/1972 | Fed. Rep. of Germany | 364/474 |
| 2311368 | 9/1974 | Fed. Rep. of Germany | 364/474 |
| 2408385 | 9/1974 | Fed. Rep. of Germany | 364/474 |

OTHER PUBLICATIONS

"Microprogrammed Diagnostics for I/O Attachments", (pp. 2073-2075), IBM Technical Disclosure Bulletin, vol. 15, No. 7, Dec. 1972.

Spizig, Siegfriend, "Rechner uberwachen und Steuren Werkzeugmaschinen" (Computers Monitor and Control Machine Tools), *Werkstatt und Betrieb*, vol. 103, No. 3 (1970) on pp. 167 and 170.

Cope, Kenneth L., "NC Maintenance for the Future", *American Machinist*, vol. 117, No. 25 (1973) on pp. 71-73.

*Primary Examiner*—Joseph F. Ruggiero
*Attorney, Agent, or Firm*—Cyril M. Hajewski

[57] ABSTRACT

A diagnostic communication system for machine tools interlinks a computer controlled machine tool with diagnostic and analysis equipment located at a location remote from the machine tool. The computer associated with the machine tool is connected with the diagnostic apparatus over a telephone line, and the machine tool is caused to execute a predetermined routine as a result of instructions transmitted to the computer from the diagnostic apparatus. The operating characteristics of the machine are monitored during the operation of the machine, and are communicated to the diagnostic apparatus, where they are compared with corresponding characteristics previously collected for the same machine, and with design limit parameters. Such comparisons furnish an indication of the present operating condition of the machine tool, and establish trends, which are useful in identifying the nature and location of incipient faults or failures before they occur. The system is used both as a diagnostic tool for diagnosing abnormal machine conditions and as a preventative maintenance tool for performing preventative maintenance operations on a routine basis.

13 Claims, 12 Drawing Figures

104
START
106
IS KL8 FLAG SET?
NO
108
110
EXIT TO SYSTEM
YES
113
112
SETUP : MODIFY ENTRY TO RECEIVE CHARACTERS
114
SAVE IDLE ENTRY INST.
116
MODIFY CALL TO SETUP
READ
122
124
EXIT TO SYSTEM

204
START
206
LOAD COMP. EX. DIAG.
208
CALL MODEM HANDLER
210
LOAD MACH. EX. PROG'S.
212
MODEM HANDLER
SEND STARTING PARAMETERS TO MACHINE COMPUTER
214
216
LOAD TORQUE CHECK
CALL TORQUE CHECK
218

START
126
128
KL 8 FLAG SET?
NO
129
EXIT TO SYSTEM
130
132
YES
READ CHAR
134
136
LEADER CODE?
NO
146
148
FIELD CODE?
NO
154
156
STORE CHAR IN WORD 1
138
YES
140
CALL READ
150
YES
MODIFY FIELD INST.
152
158
CALL READ
142
READ CHAR
STORE CHAR IN WORD 2
160
EXIT TO SYSTEM
144
184

C
244
286
PLUS OR MINUS
MINUS
288
PLUS
290
RUN LOST MOTION TEST
292
LOST MOTION HIGH?
294
NO
296
YES
299
PRINT LOST MOTION RESUT
300
INSPECT TRIG.
298
FAULT ?
302
YES
304
D
NO
306
INSPECT FREQ.
308
FAULT ?
310
YES
312
NO
314
PRINT P.C. BOARD FAILURE LIST
322
LIST AVAILABLE TESTS
324
PRINT MECHANICAL MALFUNCTION NOTICE
316
SET BAD FILE FLAG
315
SET MACHINE DOWN FLAG IN SCHEDULE LIST
317
319
F
D
304
PRINT P.C. BOARD FAILURE POSSIBILITIES
318
LIST AVAILABLE TESTS
320

A
348
350
CYCLE ON
NO
352
354
EXIT TO SYSTEM
355
YES
D
374
INC CLOCK COUNTER
378
INC CLK COUNTER
356
CLK COUNT= INTERVAL
YES
384
380
NO
READ FREQ & TRIG
358
386
360
STORE CLK FREQ & TRIG
CANCEL D SCHEDULE A
382
362
SET INTERVAL TO CLKT + INTERVAL
368
364
CYCLE ON?
NO
366
SET A DONE FLAG
370
YES
CANCEL A SCHEDULE D
372
EXIT TO SYSTEM
376

DIAGNOSTIC COMMUNICATIONS SYSTEM FOR COMPUTER CONTROLLED MACHINE TOOLS

Matter enclosed in heavy brackets [ ] appears in the original patent but forms no part of this reissue specification; matter printed in italics indicates the additions made by reissue.

BACKGROUND

1. Field of the Invention

The present invention relates to computer controlled machine tools and, more particularly, to a system for performing preventative maintenance on such machine tools and for diagnosing abnormal conditions.

2. The Prior Art

In recent years computer controlled machine tools have become more and more common, a large family of such machine tools being referred to generally as numerical controlled or NC machines. Typically these machines are provided with an individual computer which develops control signals for causing the various machine functions to be performed in a prescribed manner at the proper times and for processing feedback signals derived from the machine tool in developing the control signals. Such control signals are used for controlling the various drives for the several axes of the machine tool, typically including servo loops for controlling operation of the machine tool in accordance with a desired program or series of commands.

In some systems, such as the one described and claimed in U.S. Pat. No. 3,777,128 issued to Edward E. Kirkham for "Input Data Sampling Scheme For Computer Controlled Machine Tools," the collection of feedback signals from the machine tool is accomplished only at spaced times, with the control signals being developed during the intervals between such times, thereby freeing the computer much of the time to perform background programs and to execute other operations.

These machines have operated quite successfully, but because of their increased complexity, their maintenance and the diagnosis of abnormal operating conditions, when they occur, is much more difficult than with simpler machine tools. Frequently, precise identification of a faulty component, for the benefit of maintenance and service personnel, is extremely difficult and requires a great deal of time by highly skilled personnel. Successful diagnosis of many abnormal conditions is costly, not only because it is time consuming and requires the services of highly paid personnel, but also because the machine tool being diagnosed is out of service during diagnosis and maintenance. Development of automatic diagnosing and maintenance procedures is not practicable for a user of only a few machines, because of the cost of development and of the additional equipment needed, and the continuing need for highly trained personnel to operate such equipment.

An abnormal condition may take the form of a progressive deterioration in one or another aspect of machine performance, and it sometimes occurs that such deterioration goes unnoticed until it manifests itself in the failure of a fully machined part to meet specifications. It is, therefore, desirable to provide a system by which the foregoing disadvantages may be avoided.

SUMMARY OF THE INVENTION

In order to facilitate preventative maintenance and diagnosis of abnormal operating conditions, it is a principal object of the present invention to provide a systematic method and apparatus therefor for cycling a machine tool through a predetermined operating sequence and monitoring the operating characteristics of the machine tool, comparing those characteristics with corresponding characteristics which have been previously collected for the identical machine, to reveal areas of change, and to predict incipient abnormal conditions before they occur by recognizing established trends in such characteristics.

Another object of the present invention is to provide a maintenance and diagnostic system operative remotely from the machine tool site, so that no personnel who are especially skilled in diagnostic and maintenance procedures are required to be located at the machine tool site.

A further object of the present invention is to provide a remotely operated diagnostic and maintenance system which functions to compare current machine parameters with parameters collected over a relatively long period of time.

Another object of the present invention is to provide apparatus associated with a computer controlled machine tool for maintaining a record of the performance characteristics of such machine tool, sampled at widely spaced time intervals, so as to present a history of the performance characteristics of such machine tool, means for causing such machine tool to cycle through a predetermined cycle of operation after each such interval, and means for comparing operating characteristics sampled at different times to indicate a trend toward change or a lack of such a trend.

Another object of the present invention is to provide a method of performing preventative maintenance on a computer controlled machine tool including the steps of causing the machine tool to cycle through a predetermined cycle of operation, collecting signals derived from said machine tool during said cycle of operation, and analyzing machine performance by comparing the parameters represented by the collected signals with design parameters for such machine.

These and other objects and advantages of the present invention will become manifest upon an inspection of the following description and the accompanying drawings.

BRIEF DESCRIPTION OF THE DRAWINGS

Reference will now be made to the accompanying drawings, in which:

Referring now to FIG. 1, a functional block diagram of an illustrative embodiment of the system is illustrated. The apparatus generally indicated at 10 is located at the site of the machine tool, while the apparatus indicated at 12 is housed at a remote analysis location. The machine site and the remote analysis site are interconnected by telephone lines 14. Although two telephone lines are illustrated in FIG. 1, it should be understood that a single telephone line may be employed, provided that it is capable of transmitting either voice or data in both directions at the same time, by suitable techniques which are well known to those skilled in the art. A modem (or modulatordemodulator) device 16 is provided at the machine site for connecting the telephone lines 14 to the other apparatus at the machine site, and a similar modem device 17 is provided at the remote site for interconnecting the telephone lines to the other apparatus located there.

Figure 1:
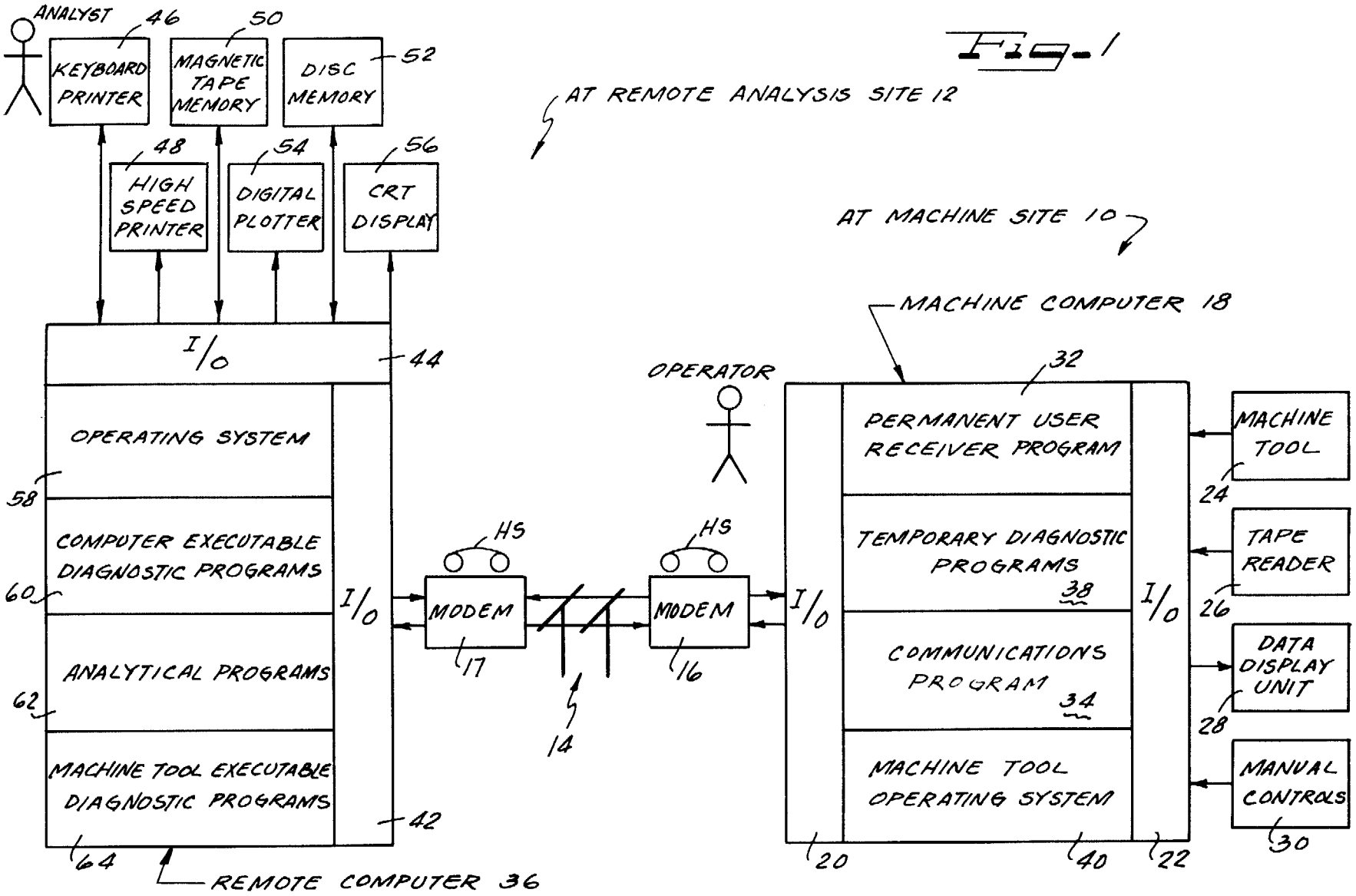
FIG. 1 is a functional block diagram of a system incorporating an illustrative embodiment of the present invention.

At the machine site, the modem device 16 is interconnected with a machine computer 18, which performs a number of functions in relation to a machine tool 24. The computer 18 is shown in FIG. 1 with two separate input-output sections 20 and 22 for the purpose of illustration. In actual practice, only one such section is needed to perform all of the functions of both sections 20 and 22. The first input-output section 20 serves to connect the modem device 16 with the control section of the machine computer 18, while the second input-output section 22 serves to connect the control section of the computer 18 with a number of peripheral devices. Such peripheral devices are the machine tool 24, a tape reader 26, a data display unit 28, and a manual control unit 30. Each of the peripheral devices 24–30 is connected by means of the input-output section 22 with the control section of the computer 18 to receive controlling signals at the appropriate time and to transmit to the computer 18 data and other signals which are used thereby in order to effect the desired operation of the machine tool 24. In this connection the machine tool 24 furnishes feedback signals to the computer 18 indicative of the current condition of the machine tool 24 and such signals are used to develop new control signals for controlling operation of the machine tool 24. Similarly, the manual control unit 30 functions to furnish signals to the computer 18 to control operation of the machine tool in a manual mode of operation.

Although not specifically illustrated in FIG. 1, the computer 18 preferably has its input-output section 22 connected to the machine tool 24 only at predetermined periodic intervals, to free the computer 18 for execution of background programs and the like while the machine tool 24 is operating. For this purpose, a sampling scheme such as that described and claimed in U.S. Pat. No. 3,777,128 is preferably interconnected between the machine tool 24 and the input-output section 22, and a storage means for manifesting controlling signals during such intervals is provided.

The machine tool 24 is of the type generally known in the art as an NC or numerically controlled machine, which is adapted to accept data in digital form (from the storage means), and to execute desired operations in response to such digital data. Apparatus for effecting the control of drive motors of such a machine is described and claimed in the copending application of Frank Zankl et al., Ser. No. 285,813, filed Sept. 1, 1972, for "AC Motor Control Apparatus" *now U.S. Pat. No. 3,878,445.*

The control section of the computer 18 incorporates four distinct groups of programs. The first group, illustrated in FIG. 1 by a block 32, contains a program for controlling operation of the modem 16 before data is supplied over the telephone lines 14 from the remote site, for receiving such data. Block 34 contains a communications program, which allows communication over the modem 16 and 18 and the telephone lines 14 between the computer 18 and the apparatus at the remote location, which includes a computer 36.

Block 38 contains temporary diagnostic programs which are designed to cause the machine computer 18 to gather data from the machine tool 24 during testing, to derive parameters which are indicative of the condition of the machine tool. Block 40 contains machine tool operating system programs, which are customarily used for causing the machine tool 24 to execute a desired sequence of operations.

The program contained in block 32 remains resident in the computer 18 at all times, and the space in the computer memory which is required to store the programs in blocks 34 and 38 is ordinarily free for the use of the computer at the machine site. During operation of the present system, the block 32 receives over the telephone lines 14 from the remote site a series of diagnostic programs which are stored in the block 38 and which are employed to cause the machine tool 24 to cycle in a predetermined way to generate data for analysis at the remote site. The communications program is also received over the telephone lines 14, and is stored in block 34. In addition, certain modifications are made to the data in the operating system programs stored in block 40, to insure that the machine tool performs the same operations during each diagnostic testing.

The remote computer 36 includes an input-output section 42, which interconnects the modem unit 17 with the control portion of the computer. It also includes a second input-output section 44, by which the control section of the computer is connected with a plurality of peripheral devices. As in the computer 18, only one input-output section is required in actual practice. The peripheral devices include a keyboard printer 46, a high speed printer 48, a magnetic tape memory unit 50, a disk memory unit 52, a digital plotter 54, and a CRT display 56. All of the peripheral devices shown at the remote computer site in FIG. 1 are not essential, but are desirable for maximum efficiency and flexibility of operation. At least one peripheral memory unit or mass storage device, and the keyboard printer 46 or other devices capable of performing equivalent functions, is required as a minimum in order to provide a data base, and means for furnishing information to the computer 36 and for displaying in printed or other fashion information generated by the computer 36.

The control section of the computer 36 includes a block 58 which contains programs which are referred to as the operating system. These programs control operation of the computer 36. Block 60 includes computer executable disgnostic programs, which programs are transmitted over the telephone lines 14 to block 38 of the computer 18, and which cause the machine computer 18 to perform the desired sequence of operations to generate data for analysis.

Block 62 of the computer 36 contains the analytical programs which are used to analyze the data received over the telephone lines 14, and to print results out on the keyboard printer 46 or to display results on one of the other peripheral devices illustrated in FIG. 1. Block 64 contains machine tool executable diagnostic programs, which are the programs transmitted to block 40 of the computer 18 to control operation of the machine tool 24 during analysis.

The programs of blocks 60 and 64 are both transmitted over the telephone lines 14 to the machine computer 18, and serve the individual functions, respectively, of controlling operation of the machine computer 18 and of controlling operation of the machine tool 24 in the desired manner. In this way, operation of both the machine computer 18 and the machine tool 24 can be analyzed.

Both of the modem devices 16 and 17 include an ordinary telephone handset, HS, so that the telephone lines 14 may be employed in the conventional fashion to enable a voice communication between the machine site and the remote site. These handsets are used by the operator (at the machine site) and the analyst (at the remote site) during the operations performed in the course of the present system.

The sequence of operations typically begins by a voice link established between the two handsets, so that the operator and the analyst both know that a test is about to be conducted. The analyst gives preliminary instructions to the operator, after which the modem devices 16 and 17 are both conditioned by the operator and the analyst alike to permit interchange of digital data between the two modem devices 16 and 17. Thereafter, the remote computer 36 transmits, under the control of the operating system in block 58, the required program information to the machine computer 18, which receives such programs under control of the receive programs stored in block 32. After the serial number of the machine under test is typed into the keyboard printer 46, subsequent operations are performed under the control of the operating system programs contained in block 58 of the control section of the remote computer 36.

In one preferred embodiment of the present system, both the remote computer 36 and the machine computer 18 are computers such as the PDP8/E, manufactured by Digital Equipment Corporation, Maynard, Massachusetts, and the operating system programs in block 58 comprise the OS/8 operating system, which is a group of programs marketed by Digital Equipment Corporation especially for use with the PDP8/E and which are described in the book, "Small Computer Handbook," published by Digital Equipment Corporation in 1973. As such operating system programs are well known to those skilled in the art, they will not be specifically described herein, but will be described generally as they relate to the performance of the operations required in the course of the present system. One function of the operating system programs is to select data and programs from the peripheral devices and load these programs into blocks 60, 62, and 64 of the remote computer 36. Typically, such programs are stored in a disk memory unit 52, which is accessed by the computer 36 through the input-output section 44. Alternatively, the programs may be stored in one or more magnetic tape units 50, which are accessed by the computer 36 in the same way. Blocks 60, 62, and 64 are all portions of the main memory of the remote computer 36, which is readily accessable so that the programs stored within these blocks are available without any unnecessary delay. The operating system 58 also includes a communications program for controlling the modem 18, and which is similar to the communications program stored in block 34 of the machine computer 18, so that both the computers 18 and 36 function in the same way with respect to the modem devices 16 and 18.

The programs of the operating system stored in block 58 function to transmit over the telephone lines 14 the computer executable diagnostic programs from block 60 and the machine tool executable diagnostic programs from block 64. The communications program is also transmitted from the computer 36 and stored in block 34. The machine computer 18 then causes the machine tool 24 to operate in the customary way, performing the diagnostic programs stored in block 38, and employing the operating system programs of block 40. Except for the source of their programs and data, however, there is no difference in the operation of the machine tool 24 or of the machine computer 18 from the normal operation.

As the machine tool 24 is operated, feedback signals which are generated by the machine tool are transmitted to the machine computer 18 through the input-output section 22, and then, by the communications programs stored in block 34, these signals are transmitted in digital form over the telephone lines 14 to the remote computer 36. This data is then processed by use of the analytical programs of the remote computer 36 stored in block 62, with the results of the analysis being printed out on the keyboard printer 46 or displayed on one of the other display devices 48, 54, or 56.

When the operation of the machine tool 24 is complete, the analyst and the operator again communicate by voice over the telephone lines 14 in a conventional fashion, whereupon the analyst can orally advise the operator of the results of the test and advise further procedures which may be indicated. The further procedures may include routine maintenance to some portion of the machine tool 24 or further tests of the machine tool, performing a different series of operations to derive more data for analysis if required to diagnose an abnormal condition revealed during the routine tests. After all tests are completed, both the operator and analyst hang up their telephone handsets, breaking off the telephone link in the conventional fashion.

The analysis phase of the present system employs data which is stored in a peripheral memory unit associated with the remote computer 36, in a file identified by the serial number of the machine tool under test. The data stored in such file, which is permanently maintained in storage in one of the peripheral storage units, contains the operating characteristics of the machine tool 24 when new, and also contains the characteristics derived from the most recent three diagnostic tests of the machine tool 24. If these tests are performed quarterly, for example, the file of each machine maintained at the remote site contains a historical record of data derived from such machine during the preceding 9 months, in addition to comparable data derived from the same machine when new. By comparing the current data with the historical data, trends in the operating characteristics may readily be detected, so that incipient abnormal conditions are recognized before they result in failure or other fault. In addition, the current data from the machine is compared with minimum and maximum acceptable limits maintained in storage at the remote analysis site, so that it can readily be determined whether any change in the operating characteristics has progressed to a point where immediate corrective action is required.

Reference will now be made to the flow charts which illustrate operation of the program routines which are performed by computers 18 and 36 during operation of the present system.

Figure 2:
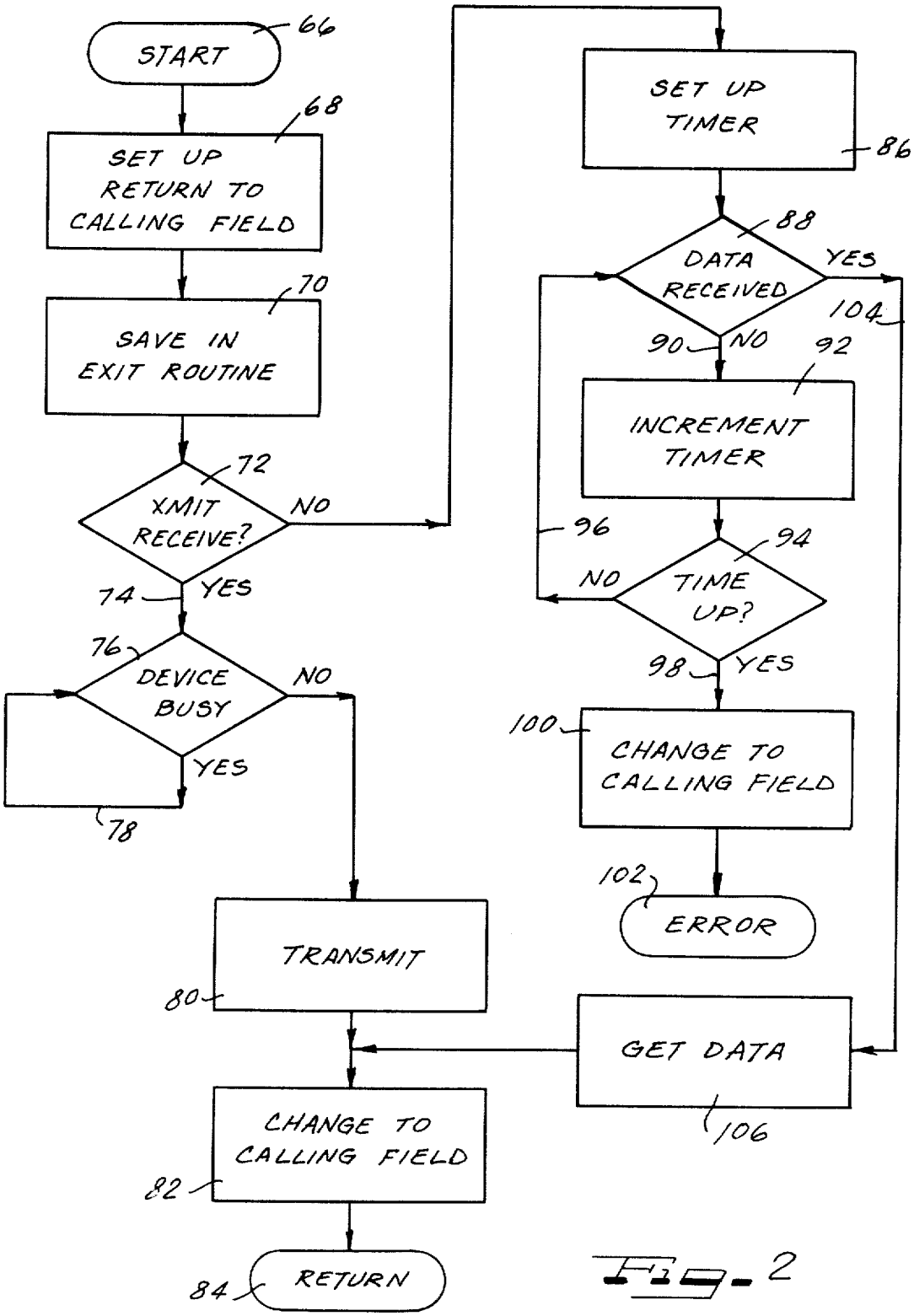
FIG. 2 is a flow chart of a program for executing a modem handler routine preformed by the remote computer of FIG. 1.

Referring to FIG. 2, the program of the transmit-receive routine, which constitutes the modem handler program employed in the remote computer 36, is illustrated. The routine is entered when called by executive or operating system program through a start terminal 66, which immediately passes control to step 68, which identifies the location of the last computer instruction step, so that after the routine is run, control may be returned to the same point in the executive sequence. Step 68 passes control to step 70, where the return address is saved by storing it in memory where it is referred to later on in connection with the exit from the routine, and control is then passed to step 72, where a determination is made as to whether a transmit or receive function is required. If a transmit function is required, branch 74 is selected and control is passed to step 76, in which a determination is made as to whether transmission can occur. If no transmission can occur at that time, the control waits in a loop 78 between an output and input of the step 76, until transmission can occur. The control is passed to step 80, which effects transmission of the data from the modem buffer to the telephone line, and control is passed to step 82, which sets up the address of the return instruction in the executive chain, which address was stored by step 70. Control is then returned to the system by way of step 84. If step 72 selects a receive routine, control is passed to step 86, which sets up a timer by identifying a location in memory where pulses are added in repetitive sequence, and then control passes to step 88. If the data is not yet received when step 88 is entered, control branches to line 90, the timer is incremented in step 92, and the incremented time is compared to a fixed quantity in step 94 to determine whether the time represented by the fixed quantity has expired. If the time has not yet expired, branch 96 is selected and control is returned to step 88. This cycle of steps continues until either the data is received or else the allotted time expires. If the time expires before the data is received, an error condition is indicated and control branches to line 98, which selects the address of the next instruction in the executive routine in step 100, and passes control to an error procedure step 102. The specific error procedure which may be undertaken forms no part of the present invention, and so will not be specifically described. A variety of error procedures may be selected, as known to those skilled in the art, including recycling of the same program steps performed prior to the error in order to attempt to receive data in an error free manner. If this does not occur within a given number of recycles, the computer may be halted and will indicate visually the reason for the halt. Hereafter it will be assumed that no error condition occurs, so the branch 98 is never selected.

When the data is received, branch 104 is selected by step 88, and the data is passed into the input-output buffer under control of step 106. Then control is passed to step 82, which has already been described, and returned to the executive routine.

The program shown in FIG. 2 is designed to transmit and receive information over the telephone lines 14, beginning and ending with the modem units 16 and 17. When the first bit of data is transmitted from the remote computer 36 to the machine computer 18, it is detected by the permanent user receiver program illustrated in FIG. 3. This program is entered by terminal 104 periodically and continuously during all normal modes of operation of the machine computer 18. Preferably a clock-type device is employed to bring about periodic entry into the program, for example once during each successive eight millisecond period. If nothing resides in the modem buffer, the so-called KL8 flag of the modem buffer remains unset, while such flag is set when a character has been received into the buffer, as described in the Engineering Specification of the KL8/E asynchronous data control unit marketed by Digital Equipment Corporation for use with the PDP8/E. Control passes from the input terminal 104 to step 106, where the condition of the KL8 flag is inspected. If this flag is not set, indicating that no loading is required, branch 108 is selected and control returns to the executive routine or system by means of step 110.

If the KL8 flag is set, step 112 is selected, via branch 113, which configures the input-output section of the computer 18 to receive characters from the modem buffer. Control is then passed to step 114, which functions to save the address of terminal 104 (FIG. 3), and then to step 116, which configures the computer 18 to process characters by loading them into the appropriate storage portions of the machine computer 18. This is accomplished, in effect, by the routine of FIG. 3 cancelling the periodic entry into this program, and requiring instead a periodic entry into the program of FIG. 4, which functions to receive and direct the storage of further data received over the telephone line. Control is then passed to block 122, which is effective to receive a single character from the modem buffer into the input-output buffer, and store it in memory. Control is then returned to step 124, from which control is returned to the executive routine. The first character is a leader character. After the program of FIG. 3 has been executed once, it is not needed again until the diagnostic test sequence is concluded, after which it again functions to search for a character in the modem buffer.

Figures 3, 5:
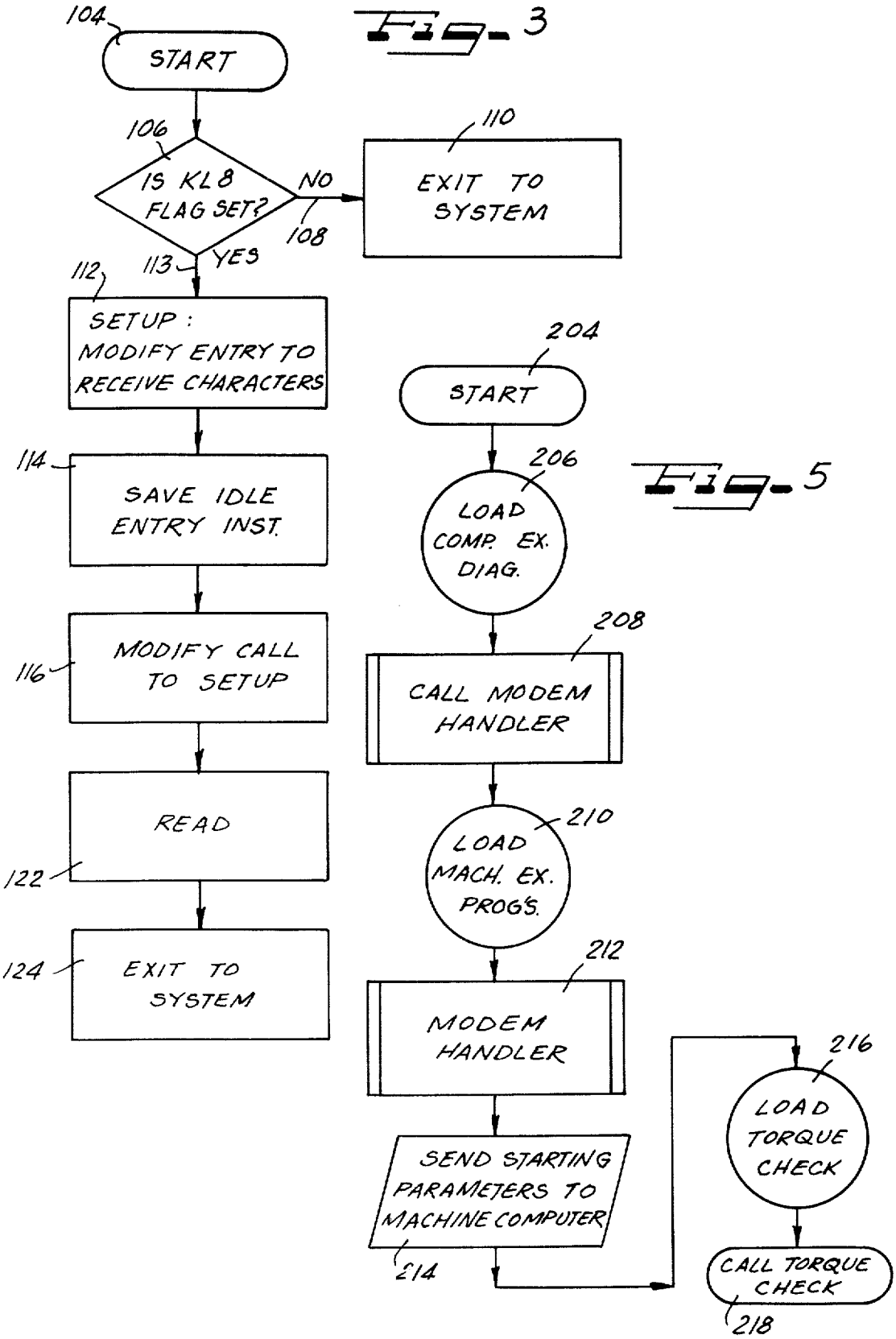
FIG. 3 is a flow chart of the permanent user receiver program performed by the machine computer of FIG. 1.
FIG. 5 is a flow chart of a torque scan routine performed by the remote computer of FIG. 1.
Figure 4A:
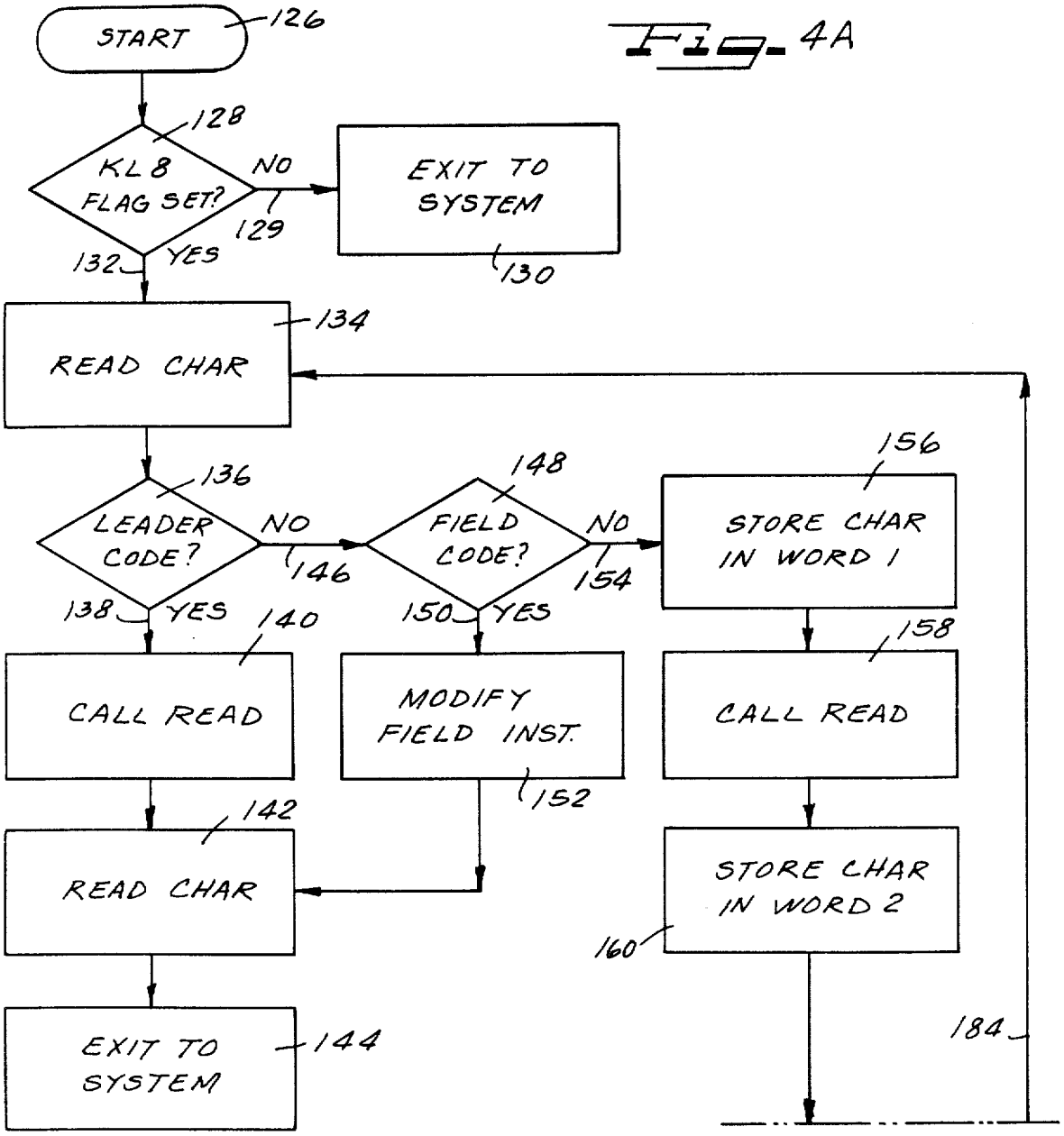
FIGS. 4a and 4b are a flow chart of a machine loader routine performed immediately after the routine of FIG. 3 by the machine computer of FIG. 1.
Figure 4B:
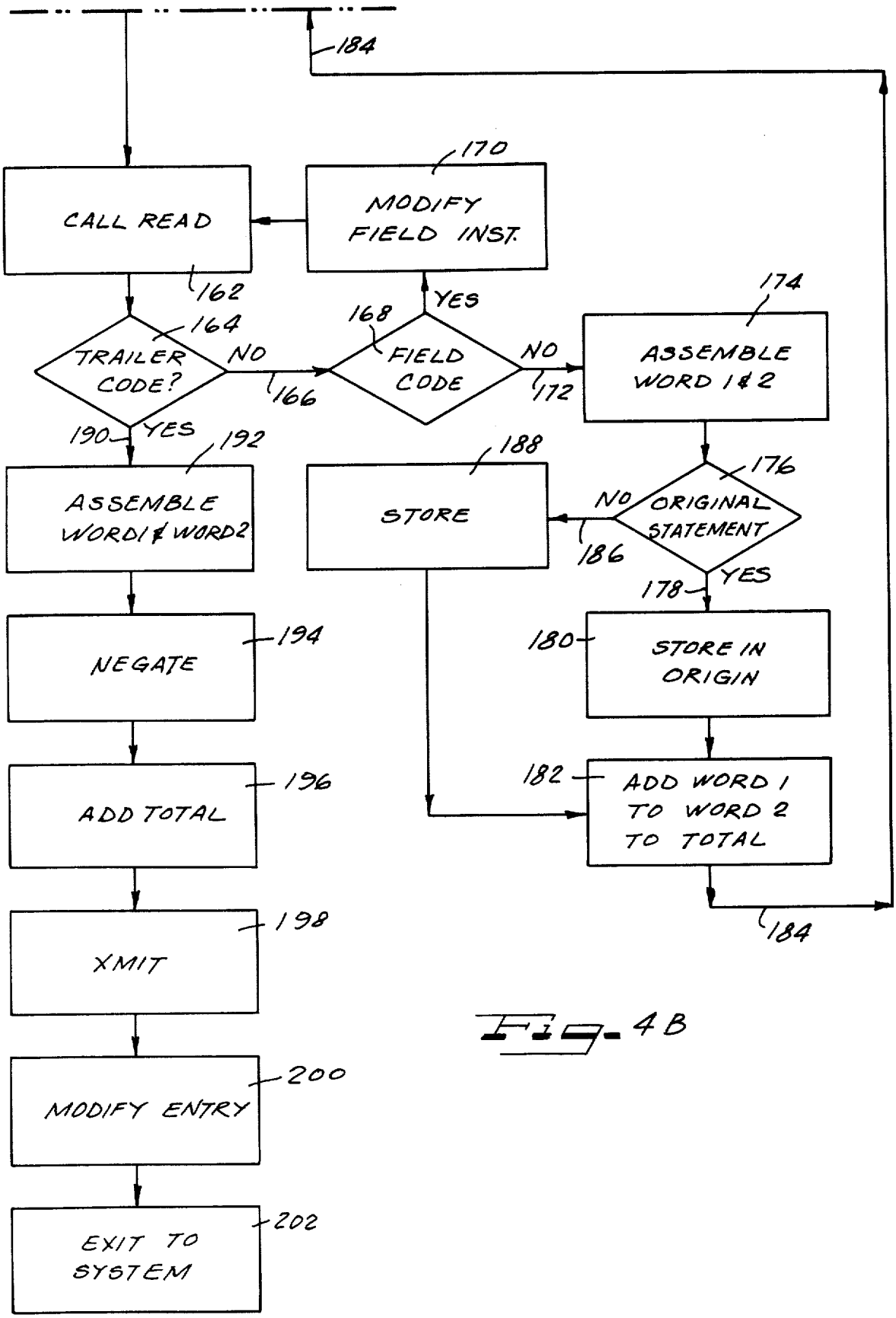

The routine of FIG. 4, referred to as the machine loader routine, is entered periodically through terminal 126, after the routine of FIG. 3 has been executed. Control is passed to a step 128 in which the condition of the KL8 flag is inspected. If the KL8 flag is not set, indicating that no data is present in the buffer of the modem 16, step 130 is selected via branch 129 to return control to the system. Otherwise, branch 132 is selected and control is passed to step 134, in which step 134 reads from memory the last character received from the modem buffer and passes control to step 136, which inspects such character to determine whether it is a leader code. If it is, branch 138 is selected and control passes to step 140, which functions to ignore such character and pass control to step 142 to receive a character from the modem buffer. Then step 144 returns control to the system.

If step 136 determines that the character is not a leader code, branch 146 is selected and the character is inspected in step 148 to determine whether it is a field code. If it is a field code (indicating an extended portion of the main memory of the machine computer), branch 150 is selected, and step 152 is performed by which the field destination of the character is modified, after which control is passed to steps 142 and 144 as described above. If the character is neither a leader code nor a field code, branch 154 is selected by the step 148 and control is passed to step 156, which is effective to store the character read in a location in memory which is referred to as "word 1." Control then passes to step 158, which functions to perform a read operation to get the next character. Then step 160 functions to store the next character in a memory location called "word 2" and control passes to step 162, which causes another read operation.

The next character is inspected in step 164 to determine whether it represents a trailer code. If not, branch 166 is selected, and the character is inspected to determine whether it represents a field code in step 168. If it does, the field destination of the character is modified by step 170 and control is again passed to step 162, which performs another read operation.

If the character is neither a trailer code nor a field code, branch 172 is selected and control is passed to step 174, which assembles the character stored in word locations "word 1" and "word 2" into a single composite word twice as long, and then passes control to step 176. Step 176 inspects the composite word to determine whether it represents an origin statement, designating the location in the main memory of the machine computer 18 where it is to be stored. If it does, branch 178 is selected to pass control to step 180, which stores the composite word in the designated location. Then control is passed to step 182, which adds words 1 and 2 togehter and adds the sum to the contents of a memory location identified as "total," storing the sum in "total." Any overflow, during such addition, is ignored. Control is then passed by a branch 184 back to step 134, and the subsequent operations are performed in the manner described above. If the composite word formed in step 174 is not an origin statement, step 176 selects branch 186 and passes control to step 188, which stores the composite word in the memory location indicated by the last received origin word, and increments such origin word. Control is then passed to step 182, which adds "word 1" and "word 2" to the contents of the "total" memory location, after which control is returned to step 134.

When a trailer code is identified in step 164, indicating an end of transmission, branch 190 is selected to pass control to step 192. Step 192 functions to assemble the characters stored in "word 1" and "word 2" into a single composite word and passes control to step 194, which negates the composite word. Control then passes to step 196, where the composite negative word is added to the word stored in "total," and then step 198 is executed in which the resulting sum is transmitted to the remote computer as a check on the characters received between leader and trailer codes. This sum should be zero. If it is not, an error condition is indicated. The procedures to be followed on indication of an error condition are beyond the scope of the present invention, and so will not be described herein. It will be assumed that no error condition occurs.

Following step 198, step 200 is selected, which is effective to modify the entry section so as to recognize the next received leader code. This step is necessary because leader and trailer codes constitute the same character. Thereafter control is passed to step 202, which exits to the system.

By repeatedly executing the routine illustrated in FIG. 4, the machine computer 18 is effective to place in its main memory (or in its core) the program identified in blocks 34 and 38 of FIG. 1, so that the machine computer 18 is conditioned to cause the machine tool 24 to perform the desired diagnostic operations.

Following completion of entry via the routines of FIG. 4, the machine tool 24 is adapted to function in its normal way under the control of the computer 18, just as if the computer 18 had received its controlling information in the normal fashion from the tape reader 26 instead of over the telephone lines 14. FIG. 5 illustrates a routine executed by the remote computer 36 in order to transmit the appropriate programs and data to the machine computer for loading via the FIG. 4 machine loader routine.

Although a number of operating procedures may be selected for running by the machine tool 24, an example of one such progam will suffice to illustrate the present invention. For the purpose of this example, the machine tool 24 will be caused to move along one of its axes at a relatively slow rate, then at a medium speed and at maximum speed, and at the rapid traverse speed which is greater than the maximum speed during a cutting operation. The program illustrated in FIG. 5 is referred to as the torque scan program, because its function is to load the machine computer with programs which causes the machine tool 24 to move a slide at a succession of speeds while the required torque of the machine drive is sampled, to allow comparison of the commanded torque at various speeds with the historical and design data for that machine.

Figure 6A:
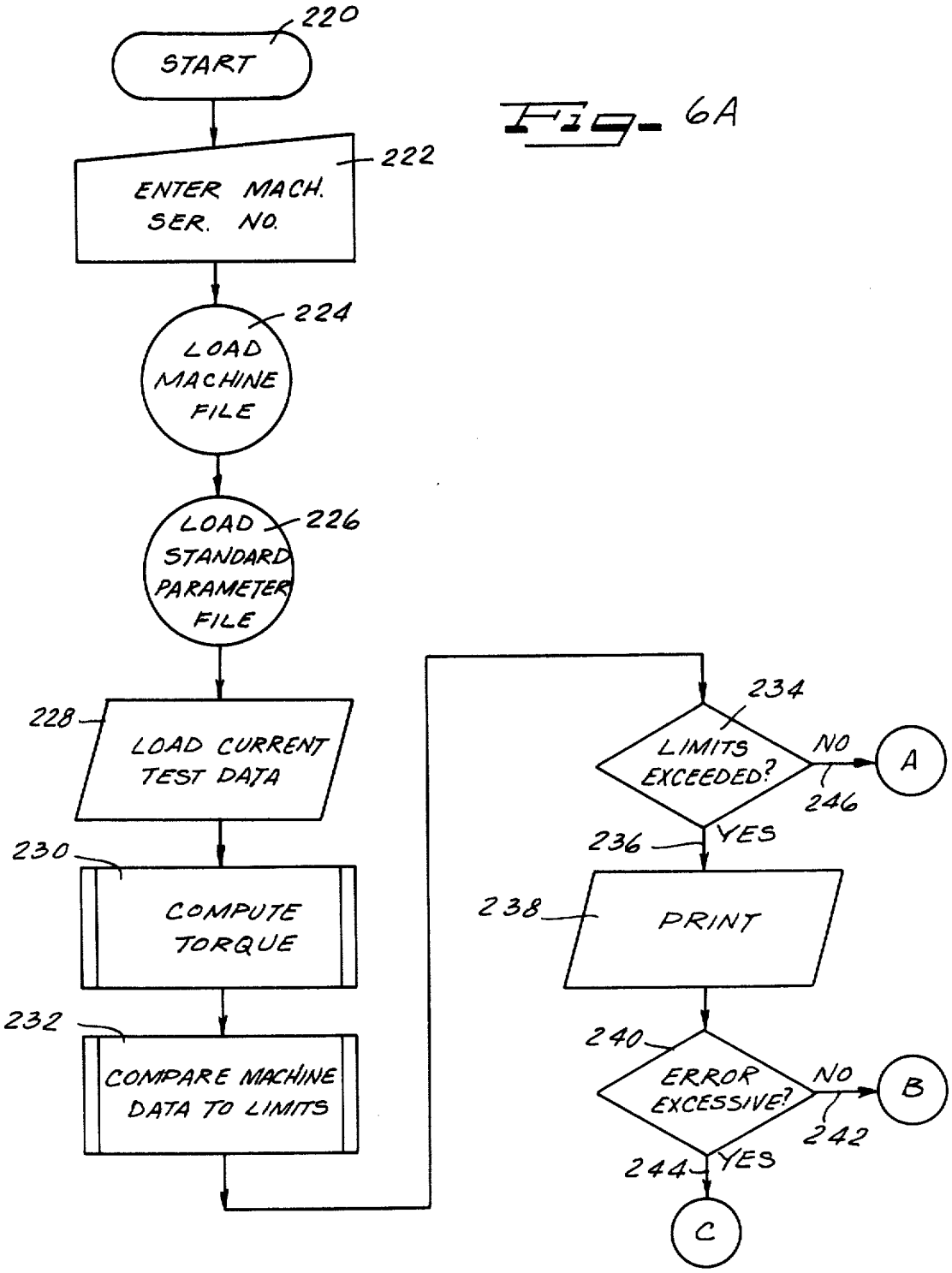
FIGS. 6a–c, taken together, are a flow chart of a torque check routine performed by the remote computer of FIG. 1.

The torque scan program is entered at terminal 204 and control is passed to a step 206, which causes the operating system stored in block 58 of the remote computer 36 to call the computer executable diagnostic routine into its core. Step 206 is simply a transfer step which transfers the computer executable diagnostic programs stored in one of the peripheral memory devices 50 and 52 into the main memory of the computer 36. Control is then passed to step 208, which passes control to the modem handler program, (FIG. 2) to transmit the torque scan routine to the machine computer over the telephone lines 14, where it is received by the permanent user receiver (FIG. 3) and loaded by the machine loader program (FIG. 4). Control then passes to step 210, which is effective to transfer from a peripheral memory into the main memory of the remote computer 36 the machine executable diagnostic programs required for operating the machine tool 24. Then step 212 again passes control to the modem handler, so that the part programs are transmitted to the machine computer 18, where they are loaded by the machine loader routine (FIG. 4) into block 40, as shown in FIG. 1. Control then passes to step 214, which sends starting parameters to the machine computer 18, to condition the machine 24 for operation in the same manner as it is normally conditioned in response to a signals drawn from the tape reader 26 (FIG. 1). Control is then passed to step 216, which transfers into the main memory of the remote computer 36 the instructions which constitute the torque check program, which is performed to analyze the data developed by the machine tool 24 during the test, which data is transmitted over the telephone lines 14 under the control of the communications programs and which is received by the remote computer 36 by means of step 228 (FIG. 6a).

Figure 6B:
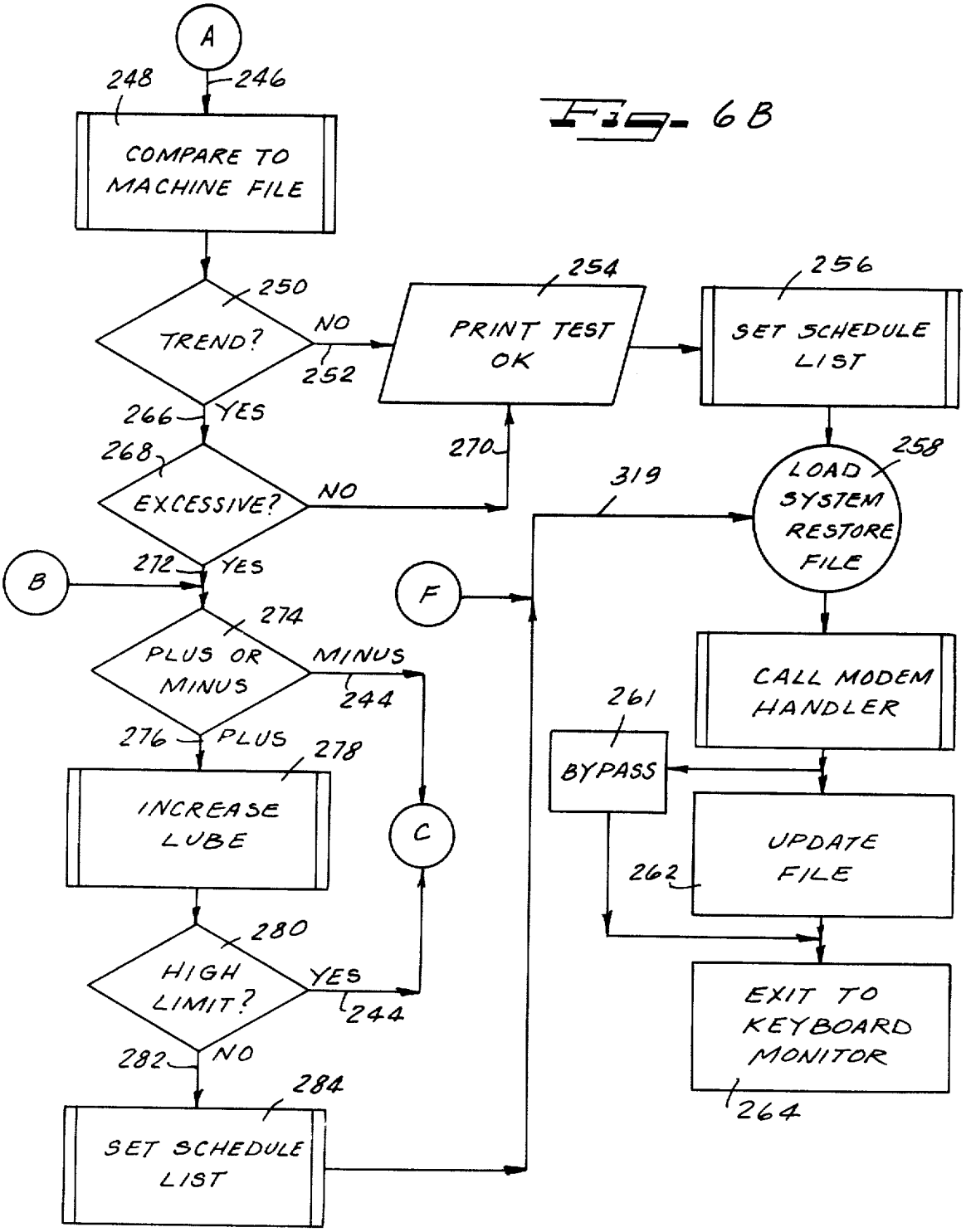
Figure 6C:
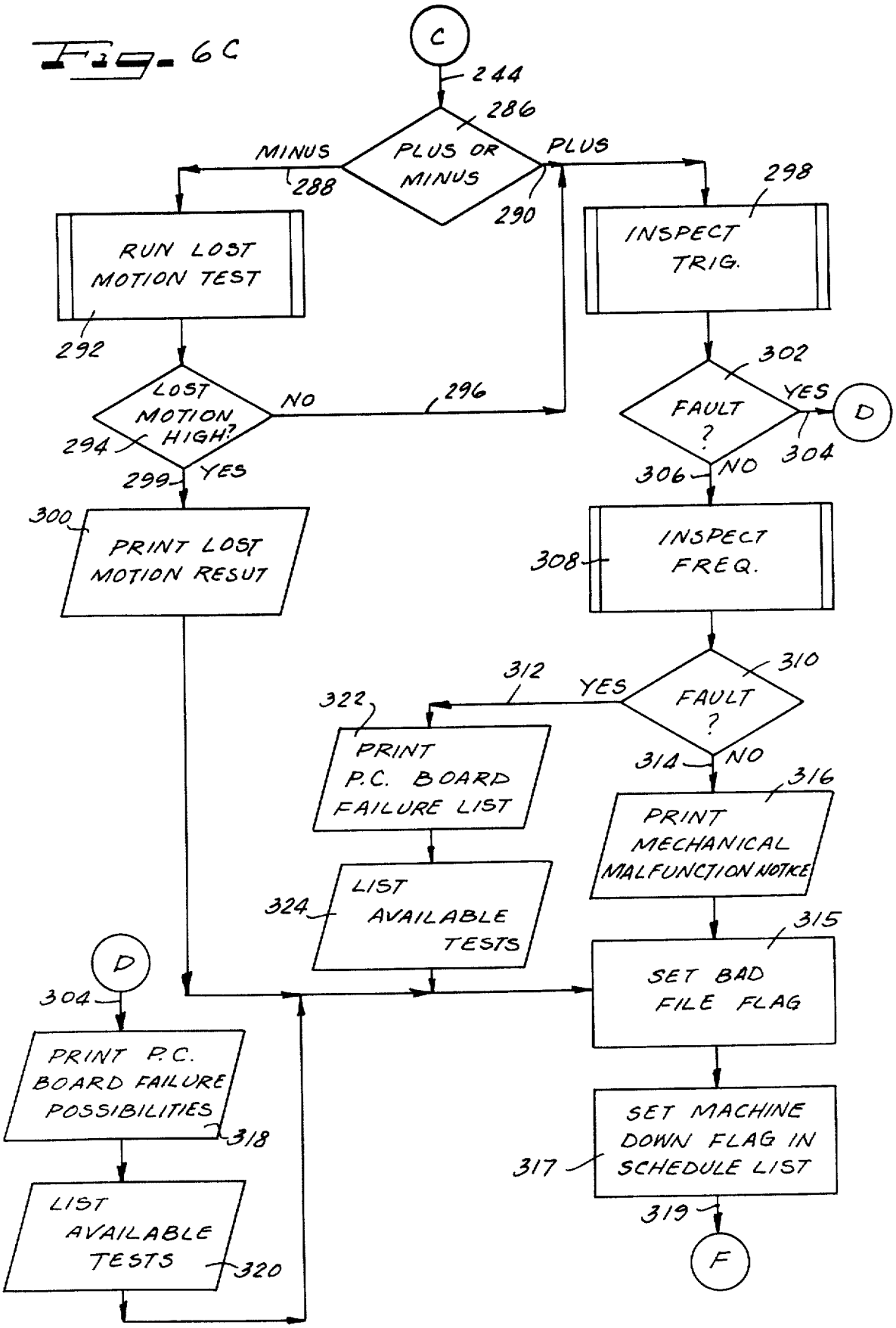

The torque check program is shown in FIG. 6. It is accessed by step 218, which passes control through a terminal 220 to step 222. The control remains in step 222 until the serial number of the machine tool under test is identified by the analyst by typing the serial number into the keyboard of the keyboard printer 46. Control then passes to step 224, where the file for that particular machine is located in the peripheral memory and loaded into the main memory of the remote computer 36. Control then passes to step 226, which is effective to locate in the main memory the standard parameters for the class of machines to which the machine under test belongs, and the standard parameter file is loaded from the memory into the main memory of the remote computer 36. Control then passes to step 228, which is effective to receive data from the modem unit 17 (by the modem handler program) as it is generated by the machine tool 24 and transmitted over the telephone line by the communications program under the control of the machine computer. The machine computer is performing the routine shown in FIGS. 7a–c while the control of the remote computer 36 rests in step 228, as described more fully hereinafter.

In the following steps it will be assumed that the machine tool 24 is equipped with an ac motor control similar to that disclosed and claimed in the aforementioned Zankl application. As described in that application, there are two motor-controlling parameters from which torque may be calculated. These two parameters are identified in such application as FREQ and TRIG. They are, respectively, representative of the frequency of the ac power applied to the drive motor, and the point during each ac cycle at which SCR's are fired to control application of the power to the motor.

Following step 228, step 230 is effective to convert the data derived for FREQ and TRIG to a torque-representative parameter. This is performed by a straight arithmetic calculation, as described in the aforementioned Zankl et al. application. Then control passes to step 232, in which the torque-representative data just derived from the machine is compared with the upper and lower maximum designed limits for the torque under the same operating conditions, which are listed in the standard parameter file loaded by step 226. Control then passes to step 234, in which a determination is made as to whether the torque limits are exceeded. If the limits are exceeded, a branch 236 is selected and control is passed to step 238, in which a printer associated with the remote computer 36 is caused to print out the upper and lower limits for the torque, together with the current value for the torque and the last previous recorded value (which, for example, is the figure derived for torque at the last routine test conducted some time previously). Control then passes to step 240, which determines whether the amount by which the torque parameter exceeds the limits provided in the standard parameter file is excessive. If the amount by which the limit is exceeded is not excessive, branch 242 is selected, while if the error is excessive, branch 244 is selected.

If in operation of step 234 the limits are not found to be exceeded, the branch 246 is selected which passes control to step 248 (FIG. 6b). In step 248, the current data is compared with the previously collected data maintained in the machine file which is loaded in step 224. The first comparison is with the original value for the torque under the same conditions when the machine was new. A similar comparison is made with respect to each corresponding value of torque maintained in file for each of the last three previous periodic tests of the machine. If the current value is greater than the original value and two of the three previously sampled values, or if the current reading is less than the original value and two of the three previous values, a trend is established, which is either a plus trend or a minus trend. Step 250, which is performed when step 248 is concluded, inspects whether or not a plus or minus trend has been recognized. If not, branch 252 is selected and control passes to step 254, which causes the printer at the remote computer 36 to print that the test is successful. Then control passes to step 256, which sets a schedule list to schedule further testing of the machine tool at the next regular time period.

Following step 256, control passes to step 258, which is effective to locate in a peripheral memory unit, associated with the remote computer 36, the system restore file, after which control passes to step 260, which controls the modem handler program (FIG. 2) to transmit the system restore file to the machine computer 18 to restore it to its original condition, as before the test was conducted.

Then step 262 receives control, and erases the oldest recorded entries in the torque file and inserts the current values in their place so that updated test results are maintained in the machine file. Then control passes to step 264, where it waits until additional keyboard operations are performed which may either call for further tests, or terminate the testing.

If a trend is recognized, step 250 selects branch 266, which passes control to step 268. Step 268 compares the magnitude of the trend calculated by step 248 with a number which represents the maximum permissible trend, and in this manner determines whether or not the trend is excessive. If the trend is determined not to be excessive, branch 270 is selected and control is passed to step 254, after which the steps are the same as described above. If the trend is found to be excessive, a branch 272 is selected which passes control to step 274. Step 274 determines whether the trend is plus or minus and, if plus, selects branch 276 which passes control to step 278. Step 278 is effective to increase the lubrication on the machine under test, by, for example, increasing the flow rate of lubricant, and passes control to step 280, which inspects the limit value previously established for maximum lubrication, such as, for example, the maximum flow rate. If the lubrication limit is not exceeded by the increase in lubrication called for in step 278, branch 282 is selected, passing control to step 284, where the schedule list is set to reschedule testing of the machine tool 24 in a relatively short time. Then control is passed to step 258. Subsequent steps are the same as described above.

If the lubrication limit is exceeded by the increase called for in step 278, branch 244 is selected. Similarly, if the result of step 274 is the identification of a minus trend, branch 244 is also selected. The branch 244 may thus be entered either from step 240, on recognition of an excessive error, or from either of steps 274 and 280.

The increase in lubrication is called for when the trend in the torque is increasing, to counteract increasing friction in the power drive, which may be responsive for the trend in the torque value. Other measures may also be taken, depending on the individual characteristic of the part of the machine under test.

If the branch 242 is selected by the step 240, in response to an indication that the error is not excessive, control is passed to the step 274, with succeeding steps being the same as described above.

Branch 244 passes control to step 286, which inspects the trend to determine whether it is plus or minus. If branch 244 is entered from step 274, step 286 simply performs the same function again, and branch 288 is selected as the trend remains minus. If branch 244 is entered from the step 280, the plus branch 290 is selected.

If the branch 288 is selected by step 244, control is passed to step 292, which is an optional step which functions to cause the computer to analyze the data for an indication of lost motion, which is recognized by inspecting parameters relating to the position of the driven machine slide, and the programmed position called for by the program, both of which are a function of time during operation of the machine tool. Control is passed then to step 294, where the lost motion is compared with a predetermined limit. If the lost motion indication is not higher than the predetermined limit, branch 296 is selected, so that control passes over branch 290 to step 298. If the lost motion indication is high, branch 299 is selected, and control is passed to step 300, which causes the printer of the remote computer 36 to print the results of the lost motion analysis, after which control is passed to a step 315, described hereinafter.

If either branch 290 or 296 is selected, step 298 extracts the received values for the TRIG parameter and inspects them to determine whether a failure can be recognized in the generation of the TRIG data. After such inspection is completed, control passes to step 302, which determines whether the circuits which generate the TRIG parameter can be recognized as faulty. If so, control is passed to a branch 304. If not, control passes over a branch 306 to step 308, which inspects the values for the FREQ parameter to attempt to recognize a faulty FREQ generation circuit, after which control passes to step 310, which decides whether a fault is recognized in a TRIG generating circuit. If so, control passes to branch 312. If not, control passes over branch 314 to step 316, which causes the printer at the remote location to print an indication that a mechanical malfunction has occurred. Then control is passed to step 315, which operates a signal that the file contains test results of a machine which is experiencing mechanical malfunction. This signal, or flag, prevents updating of the machine file because the current data is not to be used to replace earlier data. Then control passes to step 317, which sets a schedule in accordance with the fact that the machine has been found to have a mechanical malfunction, after which control is passed over a line 319 to step 258 (FIG. 6b). When step 258 is entered on line 319, step 262 is not used and control passes from step 260 to step 264 via a bypass 261.

If branch 304 is selected by step 302, control is passed to step 318, which causes the printer to print out the identification of the printed circuit board which is responsible for calculation of the TRIG parameter, along with a list of possible failures in the board which could account for an incorrect TRIG value. Control then passes to step 320, which is performed either by a printout or by activation of one of the peripheral display devices, showing the analyst the available tests which may be performed in an attempt to localize the fault in the printed circuit board which is suspected. After step 320, control passes to step 315, and the subsequent operation is the same as described above. Further tests may be selected by operation of the keyboard while the control rests in step 264.

If branch 312 is selected, step 322 receives control which causes the printer associated with the remote computer 36 to identify the PC board responsible for an incorrect FREQ number, after which control passes to step 324 which, like step 320, informs the analyst of the available tests which may be run to define the fault more specifically, and ultimately returns control to step 264.

Figure 7A:
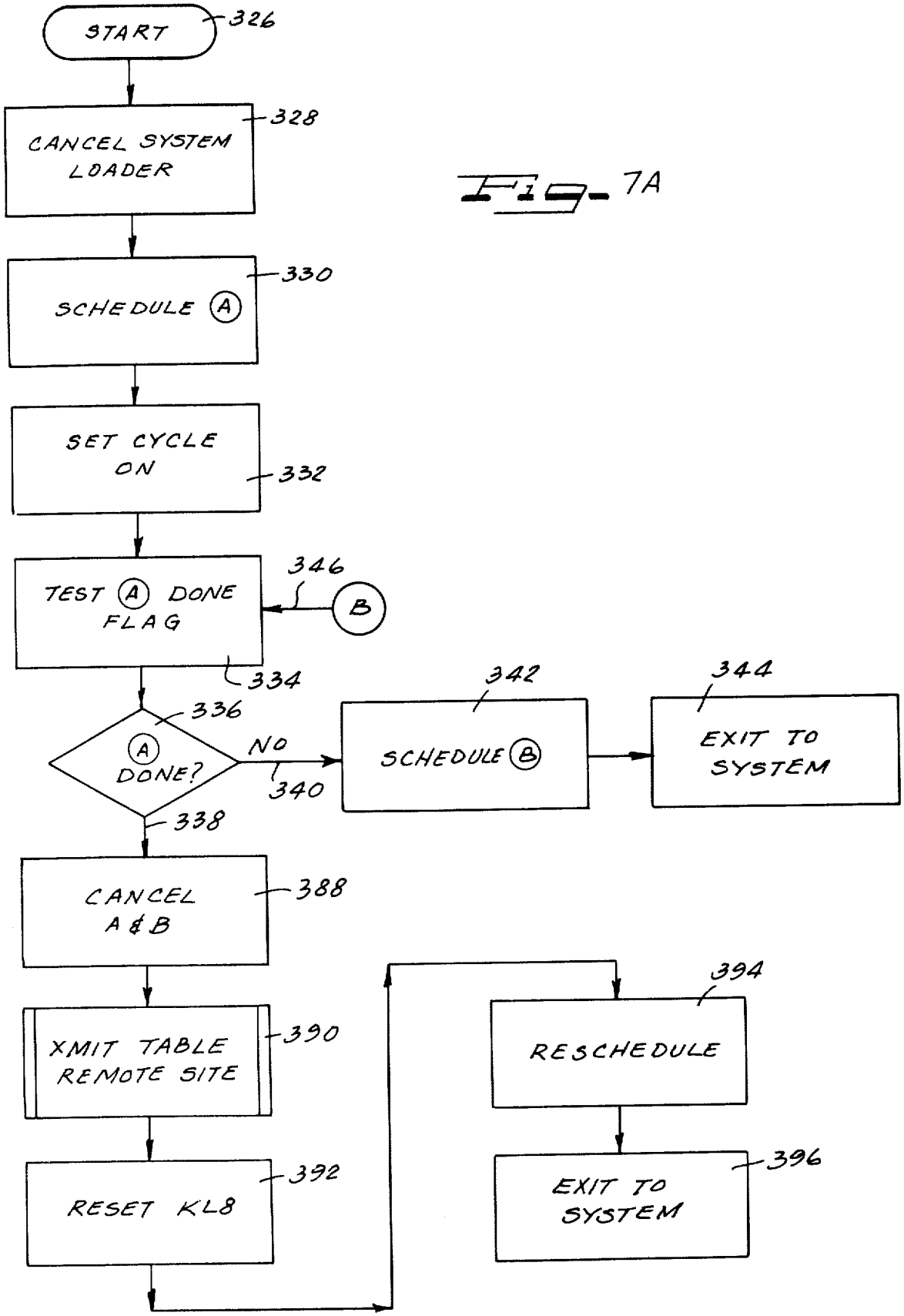
FIGS. 7a and b, taken together, comprise a flow chart of a second phase of a torque scan routine performed by the machine computer of FIG. 1.
Figure 7B:
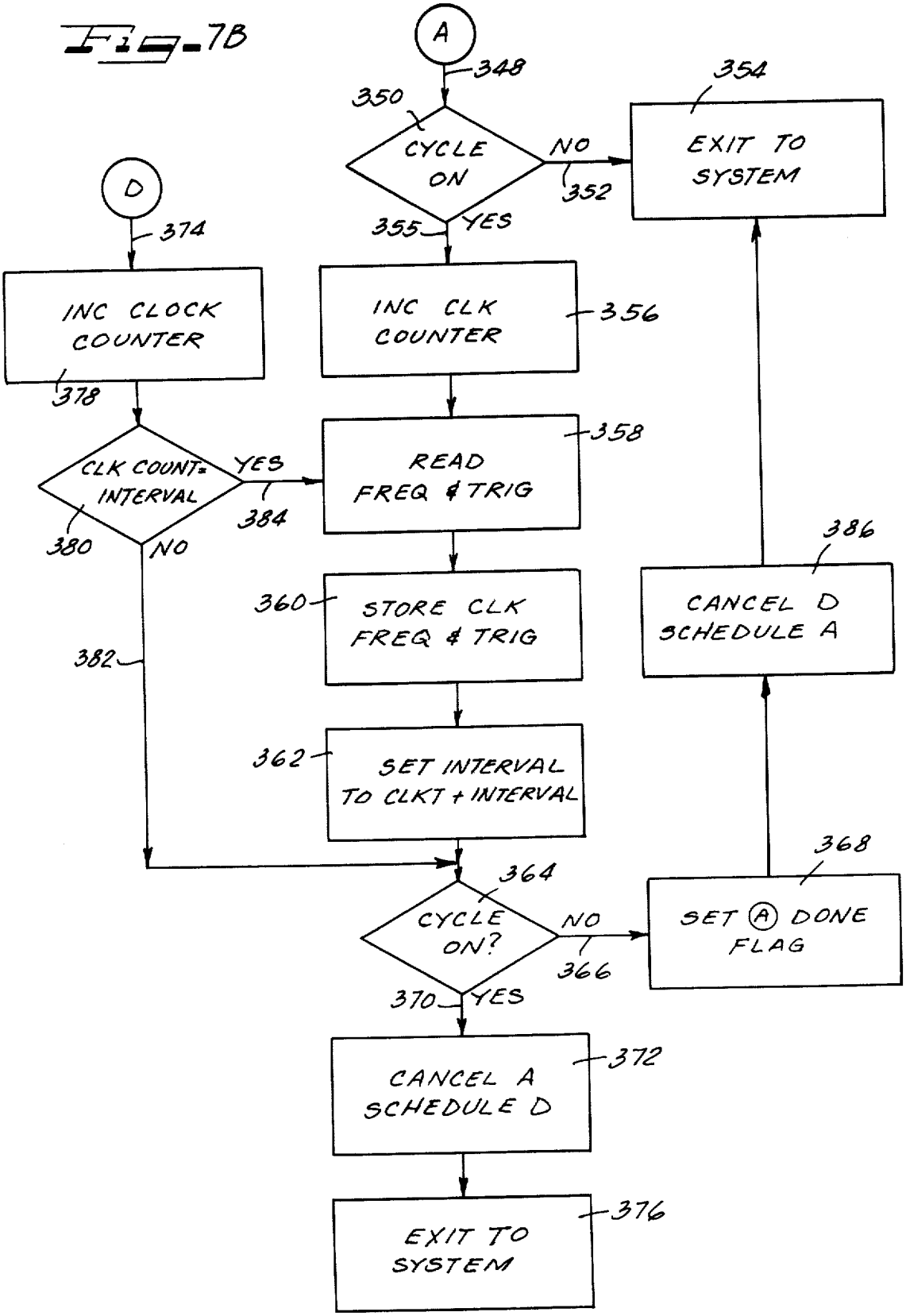

The routine which is performed by the machine computer 18, during the testing, is illustrated in FIGS. 7a–7c The routine is transmitted to the machine computer by the routine of FIG. 5, and is entered at terminal 326.

Control is passed to step 328, which cancels the system loader to prevent interruption of the program with additional information transmitted from the remote computer 36. Control is then passed to step 330, which tells the machine computer to enter the cycle testing program (at the terminal designated A) at periodic intervals. Then control is passed to step 332, which sets a flag, indicating that the cycle is on (i.e., the machine is under test) and control is passed to step 334, which tests a flag to determine whether the test has been completed. Control is then passed to step 336 to perform a branch, depending on whether the test is completed or not. If the test is completed, branch, 338 is selected, but if the test has not yet been completed, branch 340 is selected, which passes control to step 342, which is effective to schedule periodic entry of the program at step 334 (via terminal B) at relatively long intervals, compared to the intervals between entries to terminal A, after which control is passed to step 344 and control returned to the system. Periodically thereafter, step 334 is entered from terminal B along branch 346, and step 336 is performed to determine whether the test is completed. If not, branch 340 is again selected and the control exits to the system of step 344, with branch 346 again being selected at some later time.

The intervals at which branch 346 are selected are relatively long, so that after branch 346 has been entered once or twice, the test will generally have been completed. The test itself is performed by repeated executions of the program as shown in FIG. 7b, which is entered from terminal A on branch 348 periodically as a result of the step 330. Each time branch 348 is entered, control is passed to step 350, which tests to determine whether the cycle is on. If the cycle is off (because it has been completed) branch 352 is selected, passing control to step 354, which returns control to the system. If step 350 determines that the cycle is still on, i.e., the test is still running, branch 355 is selected, passing control to step 356, which increments a clock counter, and then control passes to step 358, which effects a reading of the parameters for FREQ and TRIG, generated by the performance of the usual routines which generate FREQ and TRIG in response to the commands of the diagnostic programs received from the remote computer 36 and stored in block 38 (FIG. 1). These programs are run by the machine computer 18 between entries into the FIG. 7 program via terminal A. They are fully described in the aforementioned Zankl et al. application. Control is then passed to step 360, which causes the state of the clock counter and the FREQ and TRIG parameters to be stored, after which step 362 sets an interval storage device to the current state of the clock counter, plus an interval representing the time between successive samplings of FREQ and TRIG. Then step 364 tests to determine whether the test is completed or not. If completed, branch 366 is selected and step 368 sets an "A done" flag to indicate that the test is completed and control is returned to the system by steps 386 and 354. If the cycle is not yet completed, branch 370 is selected and control is passed to step 372, which cancels the periodic entry to terminal A and substitutes a periodic entry to terminal D of the program, and then exits to the system through step 376. Thereafter, periodically the line 374 is entered via terminal D, passing control to step 378, which increments the clock counter and then passes control to step 380.

Step 380 compares the state of the clock counter with the interval stored in step 362, which signals that it is time to read FREQ and TRIG. If it is not, branch 382 is selected, which selects steps 364, with the same subsequent steps as have been described above. When the clock counter does reach the stored interval, branch 384 is selected to return control to the step 358. In this manner, each time the clock counter equals the interal, as determined by step 380, the clock, the FREQ, and the TRIG are all read and stored, so that they are available for transmission to the remote computer at the conclusion of the tests, and the data to be compared with the state of the clock counter is updated by step 362. When the test is completed, the exit from step 364 is by branch 366, which sets the "A done" flag in step 368 and passes control to step 386, which cancels the periodic entry into the D terminal, and calls for a periodic entry to terminal A. Then control is returned to step 354, which exits to the system. The next periodic entry then enters line 348 from terminal A and exits through branch 352 and step 354. This continues until the program is terminated, which occurs when line 346 is next entered from the B terminal. Then step 336 selects branch 338, since the "A done" flag is set, which passes control to step 388, which cancels the entries to terminals A and B, and passes control to step 390, which causes the machine computer 18 to transmit the table compiled with clock times and the FREQ and TRIG parameters to the remote computer 36, signifying that transmission is complete. Then step 394 reschedules the permanent receiver program to be ready for the next program forwarded to the machine computer by the remote computer. Then control passes to step 396, which exits to the system.

As described above, two computers are preferably employed, one for the machine and one for the remote apparatus; the two are adapted to communicate with each other to control operation of the machine tool 24 and to analyze the results of the testing. At the conclusion of the testing, the analyst may determine that additional testing is desirable from the results displayed in connection with the first tests. In this event, the operation is continued by supplying additional programs to the machine computer in the manner described above, which is conditioned to receive them by means of the step 394. At the conclusion of all such testing, the voice link is reestablished between the analyst and the operator to confirm that testing is complete and to restore control of the machine tool to the operator and the machine computer. The operator at the machine site may be the normal operator of the machine, but is ordinarily a maintenance man who can perform any routine maintenance procedure which may be desirable in connection with the testing. In any event, it is not necessary to the present system that he be at all skilled in diagnostic procedures.

By means of the system of the present invention, preventative maintenance may be executed on machines at widely scattered locations relative to the remote analysis site, without affecting the time or efficiency at which such tests are carried out. In addition, highly trained personnel are not required at the machine site. Highly experienced personnel are required at the analysis site especially during the period in which data for a new family of machine tools is first being acquired, since there is initially a smaller quantity of data available relating to the change of operating characteristics with time. Thus, the use of highly trained personnel is made much more efficient, and such persons can be used to best advantage in the handling of problems for which they are needed instead of in handling generally routine matters.

By analysis of the parameters and values derived from the execution of the diagnostic programs, preventative maintenance may be performed on the machine tool and portions of the machine may be indicated for special maintenance procedures, in order to forestall any major fault conditions and to replace worn parts before they fail. In the event that failure or other fault should occur, use of the diagnostic programs of the present system serves to enable quick location of the site of the fault permitting rapid repair.

Although the present system has been described in particular using general purpose digital computers such as the PDP8/E, it is apparent that the present invention is not limited to the use of such computers, as long as apparatus is provided for carrying out the necessary steps of the process. The essential features required in a hardware system for executing the system of the present invention (as opposed to programming general purpose computers) are shown in diagrammatic form in FIG. 8, which illustrates in functional block diagram form hardware adapted for carrying out an alternative embodiment of the system of the present invention.

Figure 8:
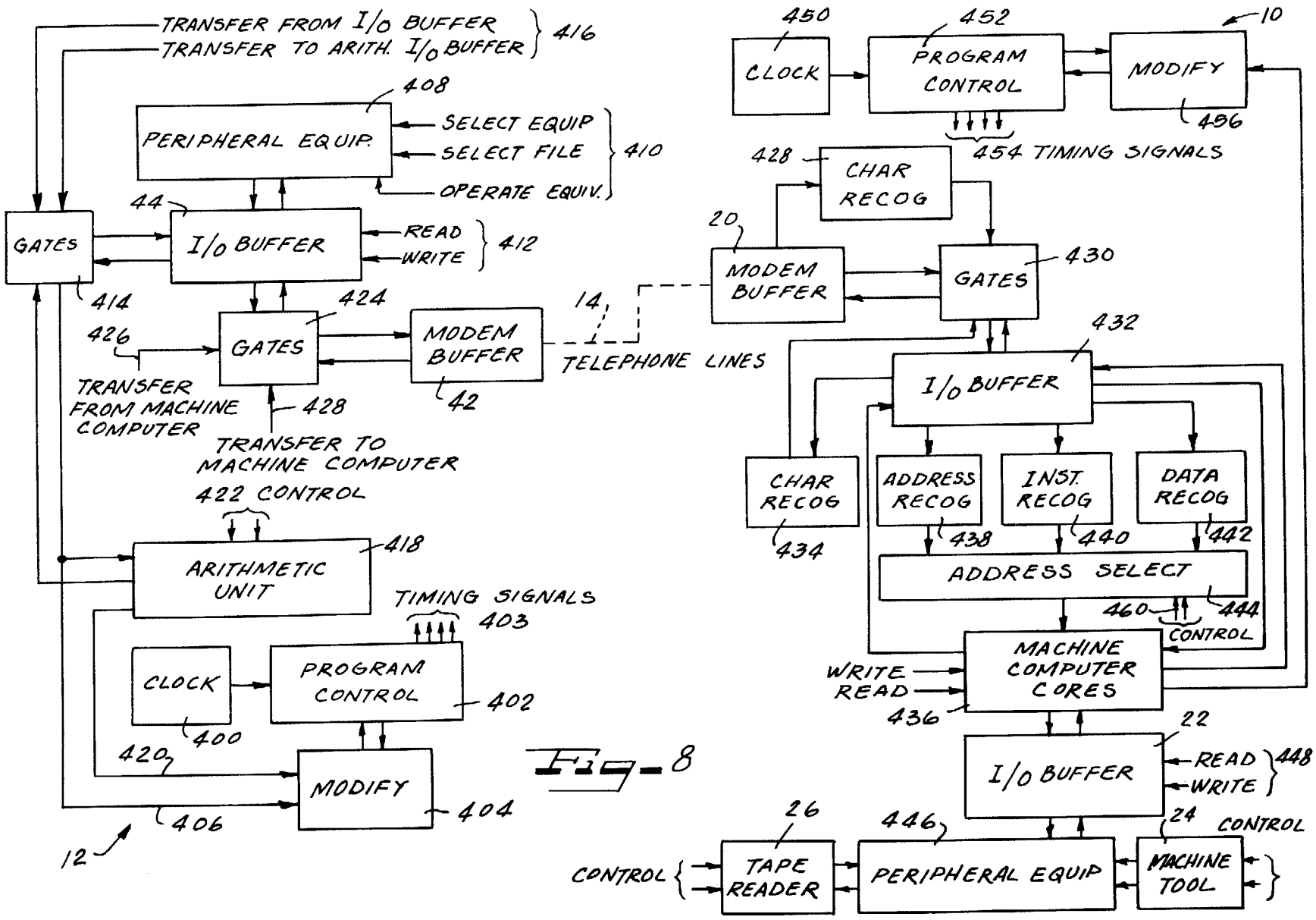
FIG. 8 is a functional block diagram of apparatus constituting an alternative embodiment of the present invention.

Referring now to FIG. 8, the essential components 12 at the remote site are connected by means of telephone lines 14 to the components 10 located at the machine site. The computer 36 at the remote site includes a clock generator 400, which is connected to drive a program control unit 402. A plurality of outputs are available from the program control unit 402 in the form of timing signals, which are adapted to time operations required in the performance of the system in the correct sequence, as explained in connection with the flow charts of FIGS. 2–7. The program control unit, in an extremely simple case, may take the form of a counter, counted by the clock generator 400, by which pulses are individually and uniquely applied to each of the several timing signal outputs 403. The outputs 403 are connected to control terminals of the various apparatus, so as to cause each function to occur successively when a given output line is energized. In this manner, the desired functions may be caused to operate in the correct succession by connecting the appropriate lines 403 of the program control unit 402 with the proper control terminals for effecting the functions which are desired to occur when that particular line is energized. A modifying unit 404 is provided to modify the speed and sequence of operation of the program control unit 402 in response to information supplied to it over a line 406. The modifying unit may, in a simple case, function to prevent the clock 400 from counting the program counter 402 until a given condition has been effected, the occurrence of which is signalled by a signal on the line 406, so that the program counter can resume its operation. In this manner, the program control unit 402 may be operated at a variable rate, depending on the speed in which each successive program step is executed, with completion of each step permitting execution of the next.

The timing signals from the program control unit are connected to control the other apparatus illustrated in block diagram form in FIG. 8. The peripheral equipment is indicated in FIG. 8 by a block 408, and lines 410 are energized by appropriate lines from the control unit 402 in order to select the proper unit from among the peripheral equipment for operation, and to select a given file or other data within a memory unit, or to otherwise operate the peripheral equipment 408 in the desired manner. The peripheral equipment is connected to the remainder of the apparatus through an input-output buffer 44, which receives on lines 412 signals directing transfer in both directions between the peripheral equipment and the input-output buffer. The input-output buffer is also connected to a plurality of gates 414, which are controlled by lines 416 in order to transfer information to and from the input-output (or IO) buffer. The information may be transferred from an arithmetic unit 418 by means of the gates 414, or it may be transferred to the arithmetic unit 418 or to the modifying unit 404. In addition, the arithmetic unit 418 may serve to condition the modifying unit 404 by signals over the line 420. Lines 422 are connected to the arithmetic unit 418, and function to control the arithmetic unit to perform its arithmetic functions in the proper time sequence. The arithmetic unit performs all necessary arithmetic operations such as add, subtract, compare, etc., in the conventional fashion.

A plurality of gates 424 are interconnected between the IO buffer 44 and the modem buffer 42 and are controlled by signals from the program control unit 402 over lines 426 and 428 to transfer characters from the buffer to the machine computer (via the IO bufer 44) or to transfer characters from the machine computer to the modem buffer 42. These signals are also derived from the program control unit 402. All of the apparatus 12 located at the remote analysis site is known per se, and therefore will not be individually described in detail. The interconnection of the apparatus and the sequence of operations controlled by signals from the program control unit 402 are effected in accordance with the foregoing description of the system.

The apparatus located at the machine site 10 includes a modem buffer 20 which is connected to a unit 428, which is adapted to recognize the presence of a character in the modem buffer. The character recognition unit 428 operates a plurality of gates 430 to transfer the character from the modem buffer and to the input-output (or IO) buffer 432. The gates 430 are also operative under control of a character recognition unit 434 to transfer characters from the IO buffer 432 through the gates 430 to the modern buffer 420, when a character is resident in the IO buffer.

The IO buffer 432 is also controlled by other portions of the machine computer 18, which is represented in FIG. 8 by the machine computer core 436. The machine computer core 436 contains all of the programs and data which are necessary to operation of the present system, because they are inserted into the machine computer core 436 in the correct location through the IO buffer 432. Associated with the IO buffer 432 is an address recognition unit 438, an instruction recognition unit 440, and a data recognition unit 442. The three units 438–442 each control an address select unit 444, to select a particular address in the machine computer core for entry of the data from the IO buffer 432. In this way, instructions and data are inserted into the machine computer core 436 with the correct addresses therefor, as determined by the unit 438. The machine computer core 436 is connected to the peripheral equipment 446 by means of an IO buffer 22, and read and write signals are applied to lines 448 to control operation of the IO buffer 22 in both directions. The machine tool 24 and the tape reader 26 (which is not used during the performance of the present system) are both connected to the peripheral equipment 446.

The apparatus at the machine site includes a clock generator 450 and a program control unit 452, which functions to produce timing signals 454 which are used to control operation of the various elements 10 at the proper time. A modifying unit 456 is connected to modify operation of the program control unit 454 and it, in turn, is controlled by signals derived from the machine computer core unit 436. The modifying unit 456 is, of course, controlled in accordance with the programs stored within the machine computer core unit 436. The timing signals 454 are also connected to control lines 460 to select appropriate addresses for accessing material within the computer core unit 436 and for storing data transferred from the IO buffer 22.

It will be appreciated that, in both the apparatus located at the machine site and the remote apparatus, the various single control lines are merely exemplary and in fact comprise a plurality of lines in most cases which are energized at different times by the appropriate program control units to execute all of the functions required of them at the appropriate times. Like the apparatus located at the remote site 12, all of the apparatus illustrated in FIG. 8 at the machine site is per se known, and therefore need not be described in detail individually. They are connected and controlled to execute the appropriate functions which are required of them in accordance with the foregoing description of the present system.

The system has been described with particular reference only to a testing sequence for monitoring the commanded torque during operation of the machine tool. It will, of course, be understood that this is but one example of a testing sequence and that the present invention is usable in a variety of other testing sequences, in which other machine parameters are measured and forwarded to the remote site for analysis. For example, in addition to commanded torque, other parameters which are preferably checked include the feed rates for low, medium, and high speeds and for rapid traverse, the following error for each axis of the machine, servo stability as indicated by the instantaneous velocity and position of the movable member of the machine tool, as compared with programmed velocity and position, position overshoot at a variety of approach speeds, and settle out time, if any, meaning the time required for the movable member to achieve its final position, measured from the time such position is first reached. In addition, the present system may be used to check operation of an automatic tool changer associated with the machine tool and the operation of other machine tool features, such as operation of the tape reader located at the machine site and operation of the machine computer itself.

In each case, the present system contemplates that the diagnostic and testing procedures originate at the remote site, so that no diagnostic or analysis decisions are required to be made at the machine site. An operator is preferably located at the machine site, however, in order to effect an emergency stop function when required, overriding the commands of the remote computer. In the event that intermittent faults or abnormalities are desired to be checked, diagnostic routines may be run on a machine tool during off hours, such as at night, and in such cases, tests may be performed without an operator present. Alternatively, when visual communication is provided from the machine tool to the analyst, by a video camera and transmission system or the like, an operator is not necessarily required in all cases. The addition of visual communication may also be desirable in other testing situations to enable the analyst to observe the machine tool in operation.

It is also within the present invention to make use of the present system for testing machine tools for proper operation as they are assembled during their manufacture, and for checking such machine tools upon installation to verify that installation has been completed satisfactorily.

It will be apparent to those skilled in the art that various modifications and changes may be made in the apparatus and methods disclosed herein, without departing from the essential features of novelty of the present system, which are intended to be defined and secured by the appended claims.

What is claimed:

1. In a computer controlled machine tool system having a machine tool, a computer for said machine tool, and a power drive means connected to effect operation of said machine tool in response to signals from said computer, the combination comprising:

a. control means located at a site remote from said machine *tool* and connected to said computer for controlling said computer to operate said machine[,] *tool so as to cause said computer for said machine tool to initiate execution of a set of predetermined diagnostic programs to gather diagnostic data indicative of the operating characteristics of said machine tool;* b. means responsive to the operation of said machine tool for communicating [selected] *said diagnostic* data from said machine tool site to said remote site[,];

c. means located at said remote site for comparing said [selected] *diagnostic* data with [predetermined] *previously gathered initial machine* data[,] *indicative of the same operating characteristics of the machine tool when it was in its pristine state; and* d. means for manifesting a difference between said [selected] *diagnostic data* and said [predetermined] *previously gathered initial machine* data.

2. Apparatus according to claim 1, including means for interconnecting said machine computer with said control means over an ordinary telephone line.

3. Apparatus according to claim 2, including a first modulator-demodulator unit at said machine site interconnected between said computer and said telephone line and a second modulator-demodulator unit at said remote site interconnected between said control means and said telephone line.

4. Apparatus according to claim 1, wherein said control means comprises means for modifying the programs performed by said computer, and means interconnecting said computer with said modifying means, whereby said machine is operated in accordance with signals originating at said remote site and not by signals originating at said machine site.

5. Apparatus according to claim 4, wherein said modifying means comprises storage means for storing a computer test program constituting a desired series of operations of said machine, means for transmitting said test program to said computer, and means located at said machine site for entering said program into said computer, whereby said computer is adapted to operate said machine tool in accordance with said test program.

6. Apparatus according to claim 1, wherein said communication means comprises a first modulator-demodulator unit interconnected between said computer and a telephone line, a second modulator-demodulator unit interconnected between said control means and said telephone line, and means for transmitting over said telephone line signals representative of the operation of said machine tool while it is controlled by said computer, and storage means located at said remote site for storing data corresponding to said signals, whereby said data is available for comparison with other data transmitted over said telephone line at a subsequent time.

7. Apparatus according to claim 6, wherein said storage means comprises means for storing a plurality of data items transmitted over said telephone line at spaced times, whereby said data is available for comparison with other data transmitted over said telephone line at a subsequent time.

8. Apparatus according to claim 1, including means located at said remote site for *gathering* and storing [representative] *diagnostic data representative* of [designed] operating characteristics of said machine tool *when said machine tool is in its pristine state,* said comparing means being operative to compare [the] *said diagnostic* data transmitted from said computer which data is representative of actual machine tool operating characteristics with [corresponding data representative of said designed operating characteristics.] *said initial machine data indicative of said operating characteristics of said machine tool when said machine tool is in its pristine state.*

9. A method for performing monitoring and diagnostic operations on a computer controlled machine tool, comprising the steps of:

a. connecting the computer at the machine tool site to control apparatus at a remote site[,];

b. controlling said computer in accordance with *diagnostic* control signals originating at said remote site to cause said machine tool to be operated in accordance with said diagnostic control signals[,] *to enable said computer to gather said diagnostic data representative of current machine tool operating characteristics;* c. transmitting said *diagnostic* data representative of current operating characteristics of said machine tool to said control apparatus during operation of said machine tool[,];

d. comparing said transmitted diagnostic data with [predetermined] *previously gathered initial machine data* at said remote site, [representative of said operating characteristics of said machine,] *indicative of machine tool operating characteristics when the machine tool is in its pristine state;* and e. manifesting the difference between said transmitted *diagnostic* data and said [predetermined] *previously gathered initial machine* data.

10. The method according to claim 9, wherein said connecting step comprises connecting said computer and said control apparatus over an ordinary telephone line.

11. The method according to claim 9, wherein said controlling step includes the step of transmitting a computer program from said control apparatus to said computer, said computer program causing said computer to operate said machine tool in a predetermined manner, causing said computer to receive said computer program for execution and executing said computer program to operate said machine tool.

12. The method according to claim 9, including the steps of maintaining a record of said predetermined data, and maintaining a record of said transmitted data at said remote location, whereby said predetermined data and said transmitted data are available for comparison with data transmitted from said computer at a subsequent time.

13. A method of monitoring and performing diagnostic operations on a plurality of separately located computer controlled machine tools, comprising the steps of:

a. maintaining at a single analysis site, remote from at least some of said machine tools, a data storage file of operating characteristics collected at spaced time intervals and relating to each of said machine tools, b. establishing a communications connection between one of said computer controlled machine tools and said remote location over a telephone line, c. controlling the computer of said computer controlled machine tool to cause its machine tool to execute a predetermined diagnostic program, d. transmitting data representative of the operating characteristics of said machine tool from said controlled computer to said remote site, e. comparing said transmitted operating characteristics with corresponding characteristics maintained in said file, and f. manifesting differences between said transmitted characteristics and said corresponding characteristics.

* * * * *

UNITED STATES PATENT AND TRADEMARK OFFICE

CERTIFICATE OF CORRECTION

PATENT NO. : Re. 31,247

DATED : May 17, 1983

INVENTOR(S) : Richard Johnstone

It is certified that error appears in the above—identified patent and that said Letters Patent is hereby corrected as shown below:

| | | |
|---|---|---|
| Column 2, | line 59, | "preformed" should read ---performed--- |
| Column 6, | line 15, | "executtable" should read ---executable--- |
| Column 9, | line 34, | "togehter" should read ---together--- |
| Column 10, | line 62, | "a" should be deleted |
| Column 12, | lines 65, 66, | "responsive" should read ---responsible--- |
| Column 14, | line 40, | "of" should read ---at--- |
| Column 15, | line 22, | "interal" should read ---interval--- |
| Column 17, | line 41, | "bufer" should read ---buffer--- |

UNITED STATES PATENT AND TRADEMARK OFFICE

CERTIFICATE OF CORRECTION

PATENT NO. : Re. 31,247

DATED : May 17, 1983

INVENTOR(S) : Richard Johnstone

It is certified that error appears in the above—identified patent and that said Letters Patent is hereby corrected as shown below:

Column 17, line 60, "modern" should read ---modem---

Signed and Sealed this

*Eighth* Day of *November 1983*

[SEAL]

*Attest:*

GERALD J. MOSSINGHOFF

*Attesting Officer* *Commissioner of Patents and Trademarks*